United States Patent
Smith

(10) Patent No.: US 9,371,060 B2
(45) Date of Patent: Jun. 21, 2016

(54) TRAILER STEERING ASSEMBLY

(71) Applicant: Eric Smith, Livonia, MI (US)

(72) Inventor: Eric Smith, Livonia, MI (US)

( * ) Notice: Subject to any disclaimer, the term of this patent is extended or adjusted under 35 U.S.C. 154(b) by 0 days.

(21) Appl. No.: 14/551,453

(22) Filed: Nov. 24, 2014

(65) Prior Publication Data

US 2016/0144835 A1 May 26, 2016

(51) Int. Cl.
*B62D 59/04* (2006.01)
*B60S 9/215* (2006.01)

(52) U.S. Cl.
CPC *B60S 9/215* (2013.01); *B62D 59/04* (2013.01)

(58) Field of Classification Search
CPC .............. B60S 9/215; B60S 9/14; B60S 9/16; B60S 9/18; B60S 9/20; B62D 59/04; B62D 51/04; B62D 51/51; B62D 51/06; B62D 59/02
USPC ...................................... 180/11, 12
See application file for complete search history.

(56) References Cited

U.S. PATENT DOCUMENTS

| | | | |
|---|---|---|---|
| D212,800 S | 11/1968 | Kimball | |
| 3,783,960 A * | 1/1974 | Feliz ...................... | B60D 1/246 180/13 |
| 4,605,086 A * | 8/1986 | Marom ................... | B60S 9/215 180/202 |
| 6,758,291 B1 * | 7/2004 | Koch ...................... | B60D 1/246 180/11 |
| 6,779,616 B1 * | 8/2004 | Brown .................... | B60D 1/246 180/13 |
| 6,945,343 B1 | 9/2005 | Moreau et al. | |
| 6,991,050 B1 | 1/2006 | Sanford et al. | |
| 7,275,907 B1 * | 10/2007 | Reichard ............... | B60P 3/1033 114/344 |
| 7,328,761 B1 | 2/2008 | Tyler | |
| 7,451,841 B2 * | 11/2008 | Nelson ................... | B62D 51/04 180/13 |
| 7,621,356 B2 * | 11/2009 | Quarberg ............... | B60D 1/246 180/11 |
| 7,931,108 B2 * | 4/2011 | Feldhaus ............ | B62D 53/0857 180/11 |
| 2006/0042841 A1 | 3/2006 | Russell | |
| 2008/0206029 A1 * | 8/2008 | Roubideaux ........... | B62D 59/04 414/441 |
| 2008/0308325 A1 | 12/2008 | Hart | |
| 2010/0270092 A1 * | 10/2010 | Hanslow ................ | B62D 59/04 180/11 |
| 2014/0202778 A1 * | 7/2014 | Barrett .................... | B60S 9/215 180/12 |

* cited by examiner

*Primary Examiner* — Kevin Hurley

(57) ABSTRACT

A trailer steering assembly includes a trailer. A mount is structured to be movably coupled to the trailer. A first actuator is coupled to the mount. The first actuator positions the mount between a raised position and a lowered position. A pair of wheels is coupled to the mount. The wheels may abut a support surface when the mount is positioned in the lowered position. A motor is coupled to the mount. The motor is mechanically coupled to the wheels. The wheels urge the trailer along the support surface. A second actuator is coupled between the mount and the wheels. The second actuator steers the wheels. A control is coupled to the mount. The control is electrically coupled to the first actuator, the second actuator and the motor. The control may actuate and de-actuate the first and second actuators and the motor.

13 Claims, 7 Drawing Sheets

TRAILER STEERING ASSEMBLY

BACKGROUND OF THE DISCLOSURE

Field of the Disclosure

The disclosure relates to steering devices and more particularly pertains to a new steering device for manually moving and steering a trailer.

SUMMARY OF THE DISCLOSURE

An embodiment of the disclosure meets the needs presented above by generally comprising a trailer. A mount is structured to be movably coupled to the trailer. A first actuator is coupled to the mount. The first actuator positions the mount between a raised position and a lowered position. A pair of wheels is coupled to the mount. The wheels may abut a support surface when the mount is positioned in the lowered position. A motor is coupled to the mount. The motor is mechanically coupled to the wheels. The motor may rotate the wheels. The wheels urge the trailer along the support surface. A second actuator is coupled between the mount and the wheels. The second actuator may position the wheels at a selected angle with respect to the mount so the trailer may be steered. A control is coupled to the mount. The control is electrically coupled to the first actuator, the second actuator and the motor. The control may actuate and de-actuate the first and second actuators and the motor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
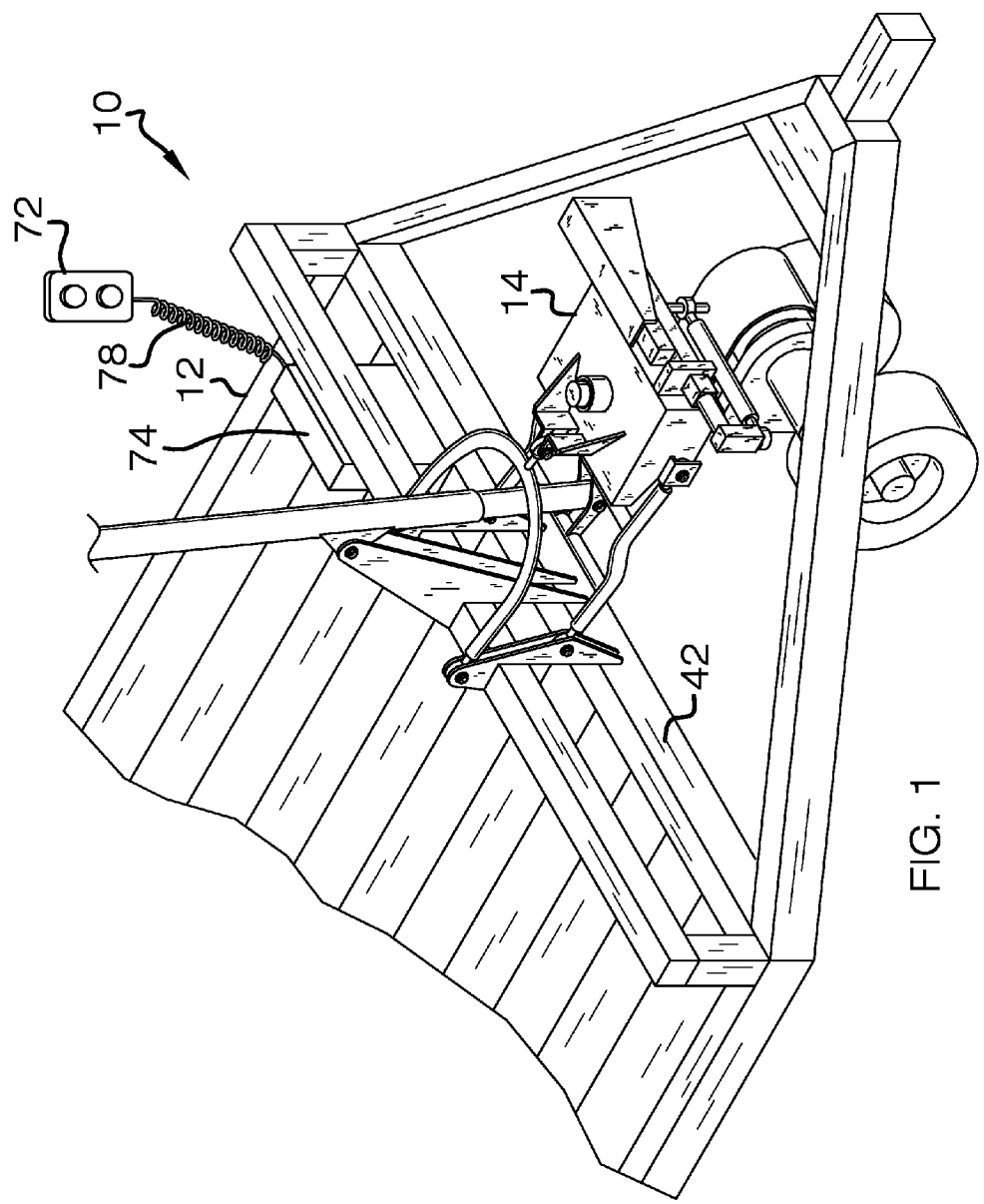
FIG. 1 is a top perspective view of a trailer steering assembly according to an embodiment of the disclosure.
Figure 2:
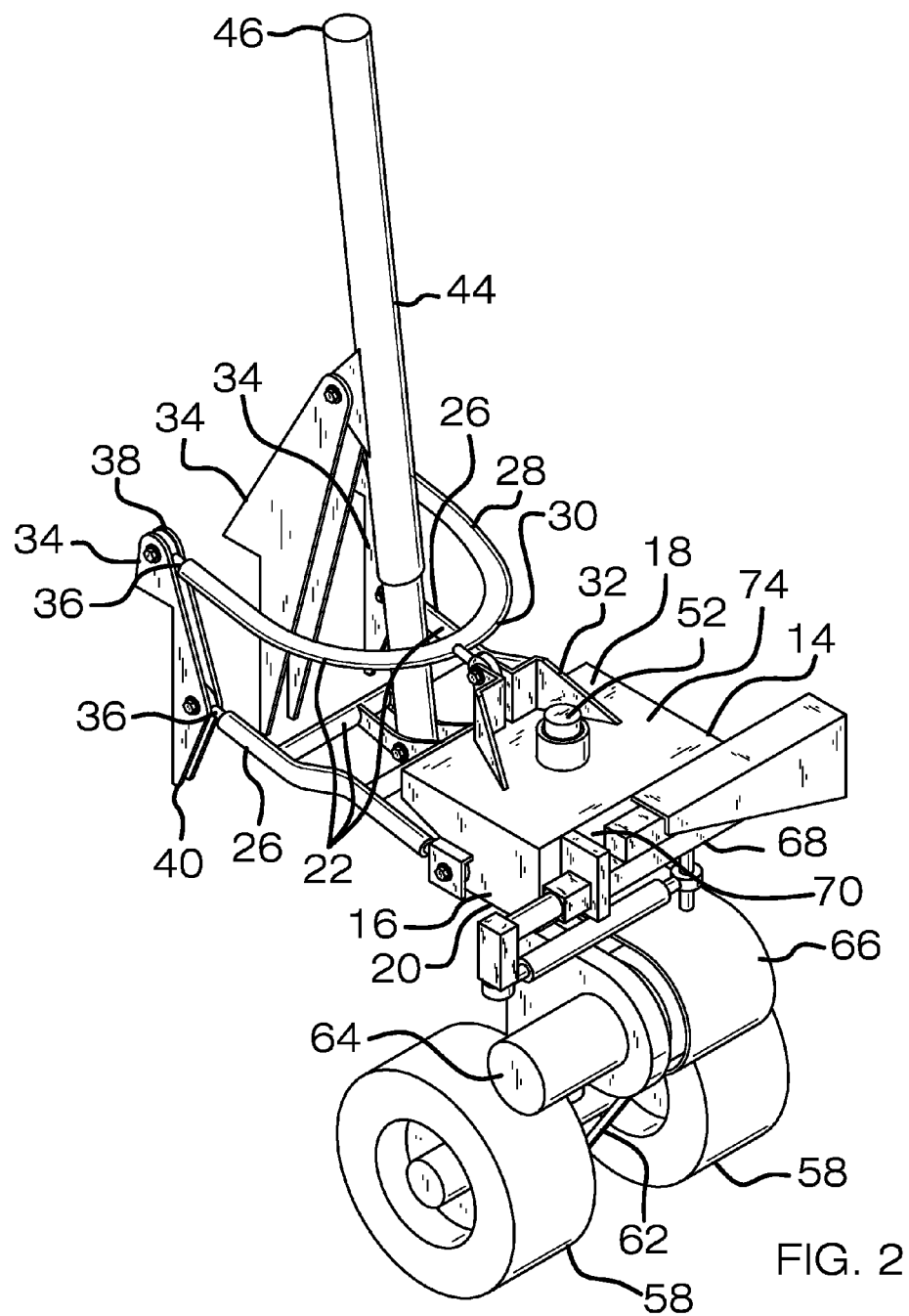
FIG. 2 is a front perspective view of an embodiment of the disclosure.
Figure 3:
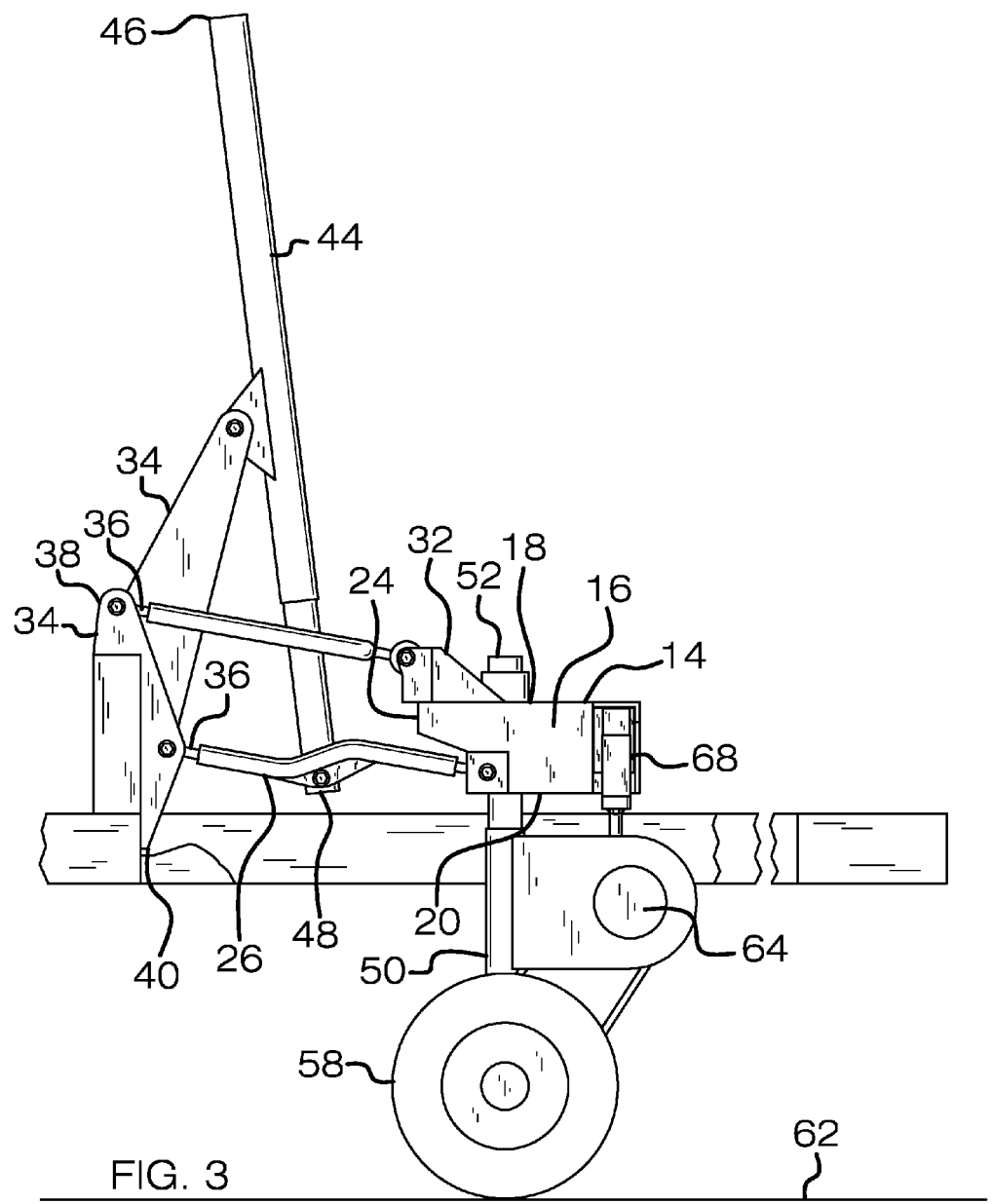
FIG. 3 is a right side view of an embodiment of the disclosure in a lowered position.
Figure 4:
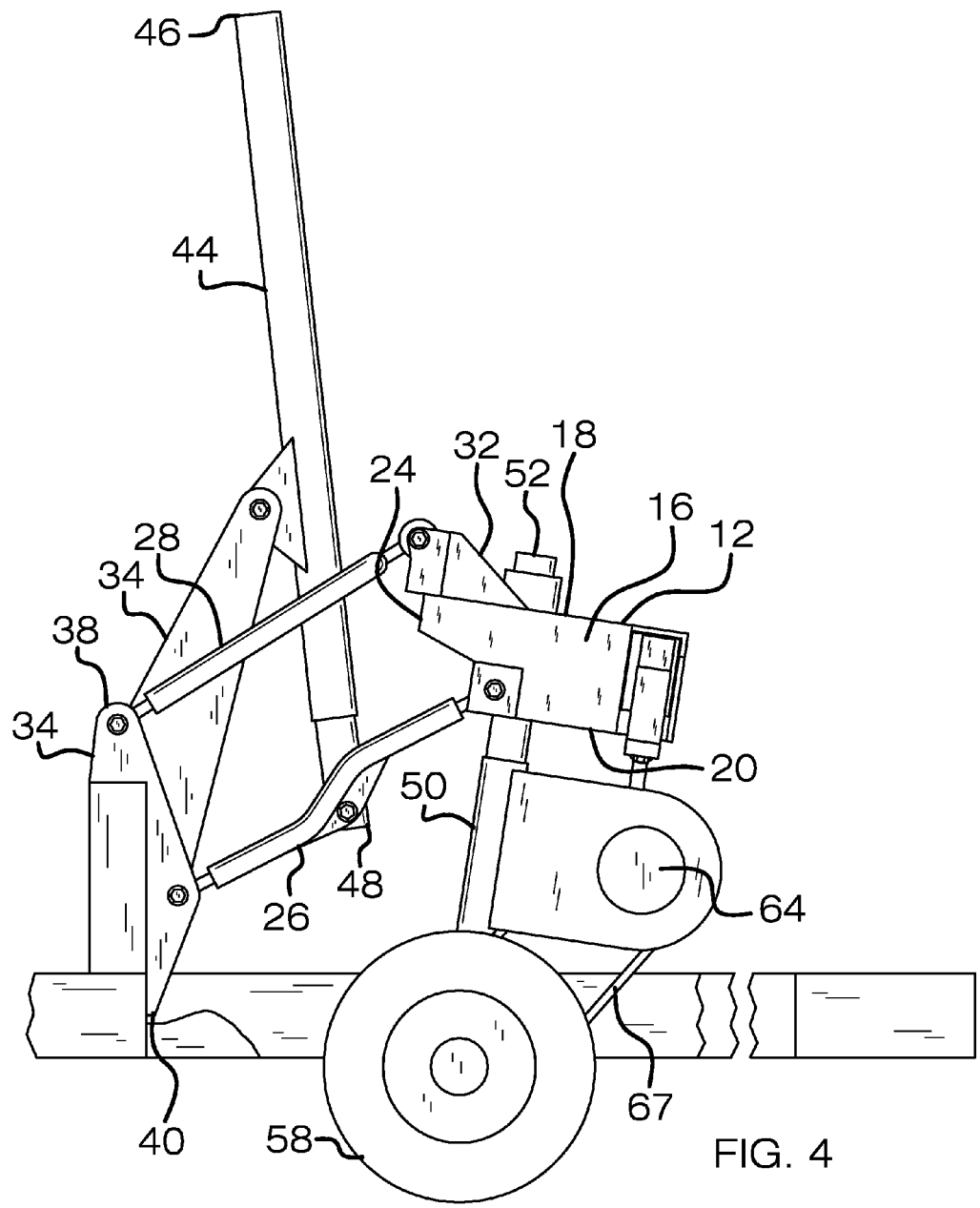
FIG. 4 is a right side view of an embodiment of the disclosure in a raised position.
Figure 5:
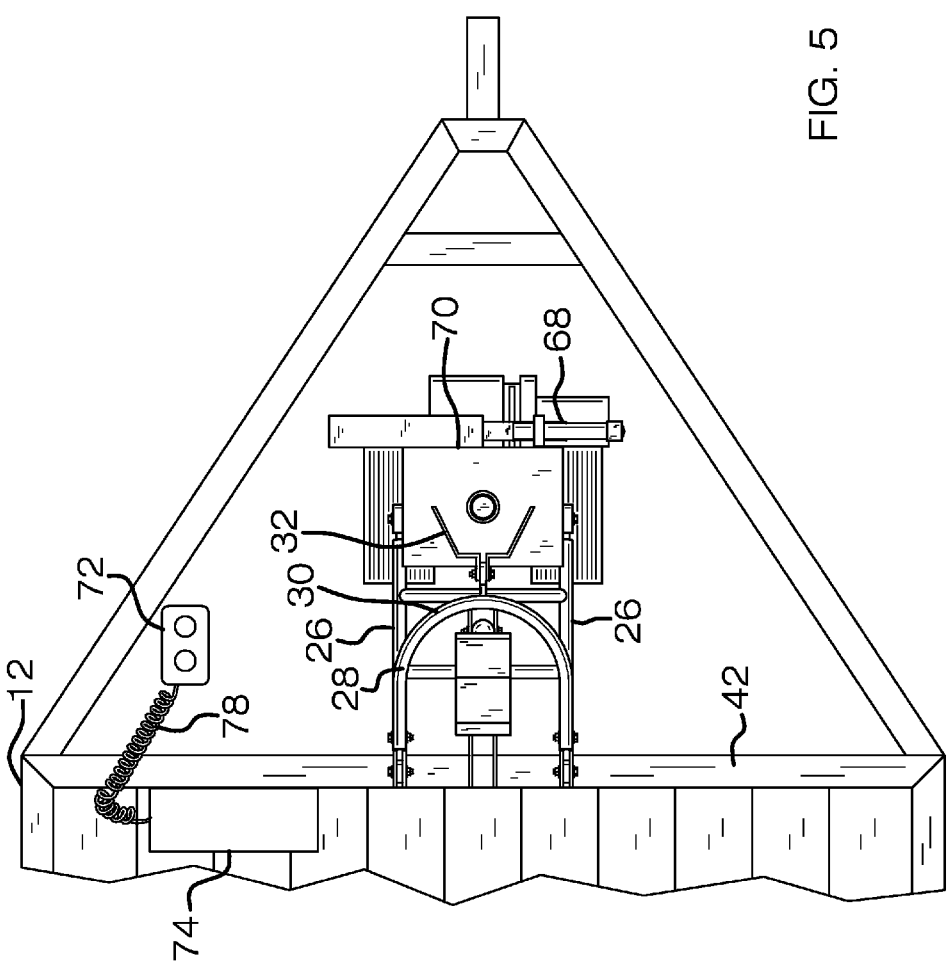
FIG. 5 is a top view of an embodiment of the disclosure in a raised position.
Figure 6:
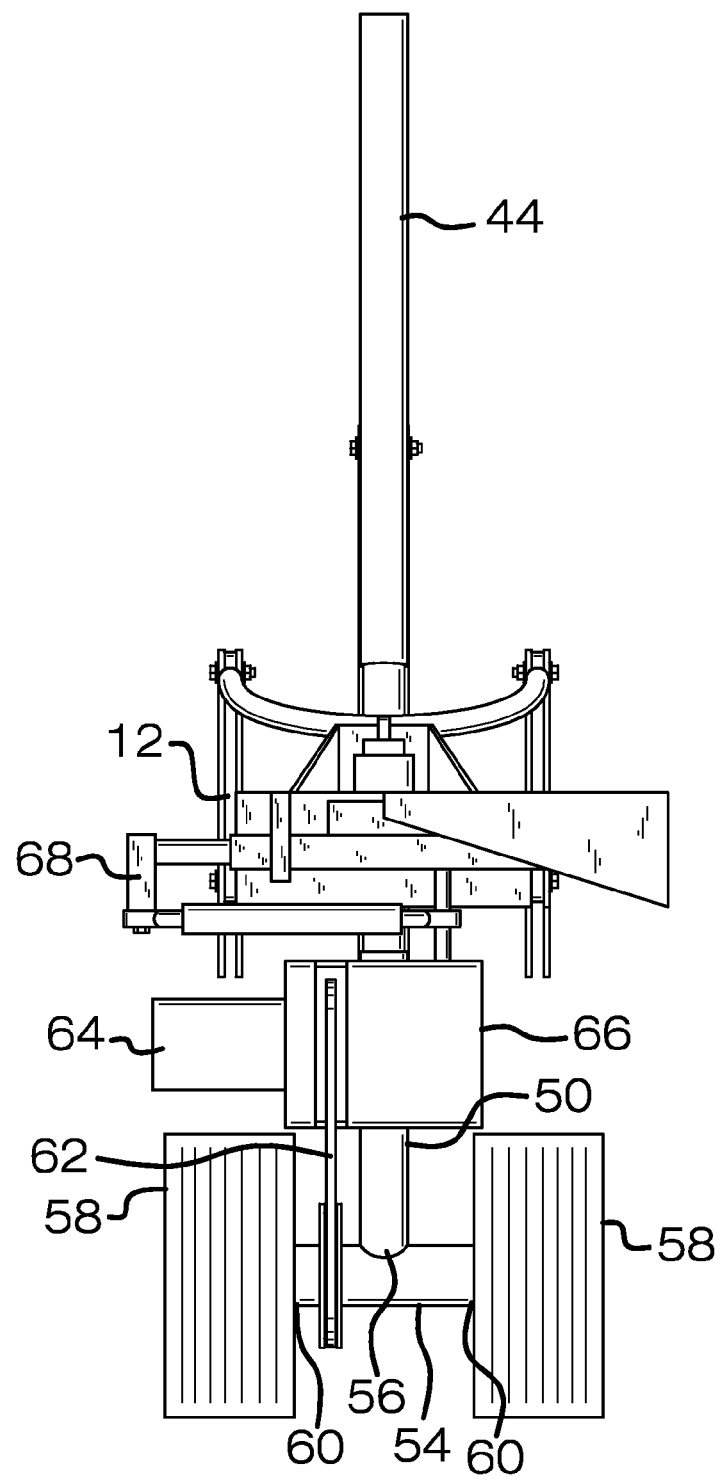
FIG. 6 is a front view of an embodiment of the disclosure.
Figure 7:
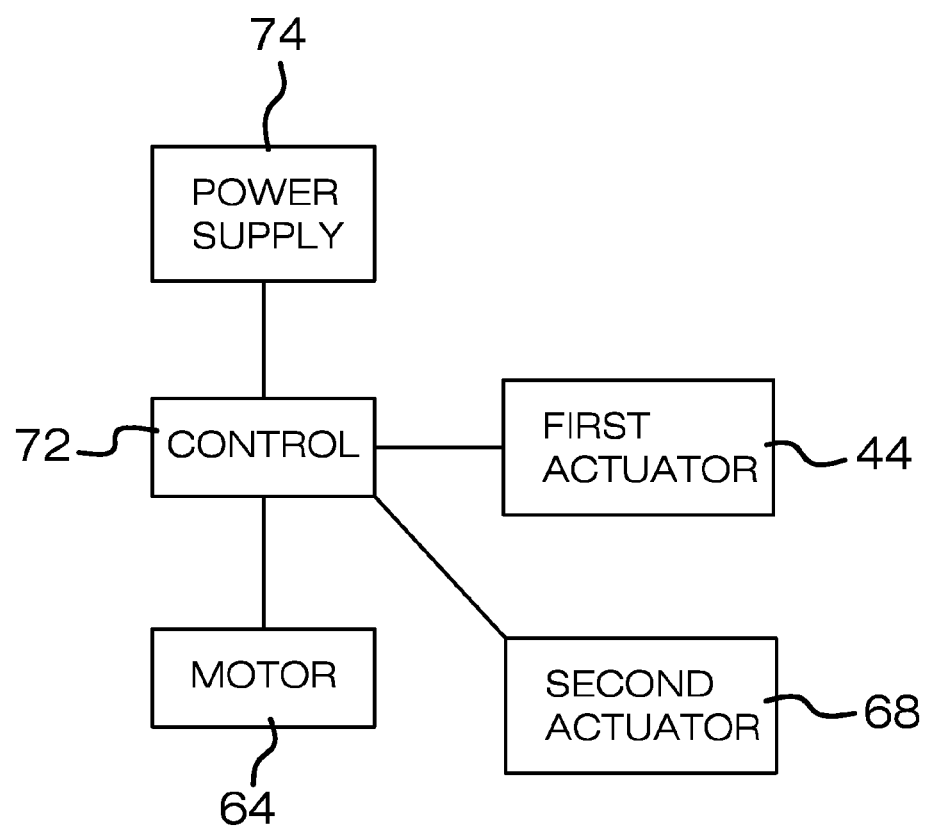
FIG. 7 is a schematic view of an embodiment of the disclosure.

With reference now to the drawings, and in particular to FIGS. 1 through 7 thereof, a new steering device embodying the principles and concepts of an embodiment of the disclosure and generally designated by the reference numeral 10 will be described.

As best illustrated in FIGS. 1 through 7, the trailer steering assembly 10 generally comprises a trailer 12. The trailer 12 may be a load bearing trailer of any conventional design. A mount 14 is provided. The mount 14 has a perimeter edge 16 extending between a top side 18 and a bottom side 20 of the mount 14.

A plurality of arms 22 is each movably coupled to and extends rearwardly from a back side 24 of the perimeter edge 16 of the mount 14. The plurality of arms 22 comprise a pair of lower arms 26 and an upper arm 28. The upper arm 28 has a centrally positioned bend 30 thereon. Moreover, the upper arm 28 has a U-shape. A coupling 32 is coupled to and extends upwardly from the top side 18 of the mount 14. The bend 30 on the upper arm 28 is movably coupled to the coupling 32. Each of the lower arms 26 is positioned proximate the bottom side 20 of the mount 14.

A plurality of gussets 34 is each movably coupled to a distal end 36 of an associated one of the arms 22 with respect to the mount 14. The distal ends 36 of the upper arm 28 are positioned proximate an uppermost end 38 of the gussets 34. Additionally, the distal ends 36 of the lower arms 26 are positioned proximate a lowermost end 40 of the gussets 34. The gussets 34 are each coupled to a front side 42 of the trailer 12. The mount 14 is movably coupled to the trailer 12.

A first actuator 44 is provided. The first actuator 44 is elongated between a topmost end 46 and a bottommost end 48 of the first actuator 44. The bottommost end 48 of the first actuator 44 is coupled between the lower arms 26. Additionally, the first actuator 44 extends upwardly through the U-shape of the upper arm 28. A pair of gussets 34 is coupled between the first actuator 44 and the front side 42 of the trailer 12. Moreover, the first actuator 44 positions the mount 14 between a raised position and a lowered position with respect to the trailer 12. The first actuator 44 may be an electrical actuator of any conventional design.

A wheel shaft 50 is provided. A top end 52 of the wheel shaft 50 extends upwardly through the top 18 and bottom 20 sides of the mount 14. The wheel shaft 50 is rotatably coupled to the mount 14. An axle 54 is coupled to a bottom end 56 of the wheel shaft 50. The axle 54 forms a T-shape with respect to the wheel shaft 50.

A pair of wheels 58 is each rotatably coupled to opposite ends 60 of the axle 54. The wheels 58 may abut a support surface 62 when the mount 14 is positioned in the lowered position. Additionally, the wheels 58 support the weight of the trailer 12 when the mount 14 is positioned in the lowered position. The support surface 62 may be ground.

A motor 64 is coupled to the wheel shaft 50. The motor 64 may be an electrical motor of any conventional design. A gear box 66 is mechanically coupled to the motor 64. The motor 64 drives the gear box 66. The gear box 66 may be a gear reduction box of any conventional design. Additionally, the gear box 66 increases a torque of the motor 64. A chain 67 is coupled between the gear box 66 and the wheels 58. The gear box 66 rotates the wheels 58 when the motor 64 drives the gear box 66.

A second actuator 68 is coupled between a front side 70 of the perimeter edge 16 of the mount 14 and the wheel shaft 50. The second actuator 68 may rotate the wheel shaft 50 in a first direction and a second direction. Additionally, the wheels 58 are positioned at a selected angle with respect to the mount 14 so the trailer 12 may be steered. The second actuator 68 may be an electrical actuator of any conventional design.

A control 72 is provided. The control 72 may be held by a user. A cord 78 is coupled to and extends outwardly from the control 72. A power supply 74 is provided. The power supply 74 is coupled to the trailer 12. The cord 78 is electrically coupled to the power supply 74. The power supply 74 is electrically coupled to the first actuator 44, the second actuator 68 and the motor 64. The power supply 74 actuates and de-actuates each of the first 44 and second 68 actuators and the motor 64. The power supply 74 comprises at least one battery 76.

In use, the mount 14 is positioned in the lowered position when the trailer 12 is to be manually moved along the support surface 62. The motor 64 is selectively actuated to urge the trailer 12 along the support surface 62. The second actuator 68 is selectively actuated to steer the trailer 12 while wheels 58 urge the trailer 12 along the support surface 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A trailer steering assembly comprising:
a trailer;
a mount structured to be movably coupled to said trailer, said mount having a perimeter edge extending between a top side and a bottom side of said mount;
a first actuator coupled to said mount such that said first actuator positions said mount between a raised position and a lowered position;
a pair of wheels coupled to said mount such that said wheels are configured to abut a support surface when said mount is positioned in said lowered position;
a motor coupled to said mount, said motor being mechanically coupled to said wheels such that said motor is configured to rotate said wheels wherein said wheels urge said trailer along the support surface;
a second actuator coupled between said mount and said wheels such that said second actuator is configured to position said wheels at a selected angle with respect to said mount wherein said trailer is steered; and
a control configured to be held by a user, said control being electrically coupled to said first actuator, said second actuator and said motor such that said control is configured to actuate and de-actuate said first and second actuators and said motor; and
a plurality of arms movably coupled to and extending rearwardly from a back side of said perimeter edge of said mount.

2. The assembly according to claim 1, further comprising a plurality of gussets each movably coupled to a distal end of an associated one of said arms with respect to said mount.

3. The assembly according to claim 2, further comprising said gussets being coupled to said trailer such that said mount is retained on said trailer.

4. The assembly according to claim 3, further comprising said first actuator being coupled between said arms and said trailer.

5. The assembly according to claim 1, further comprising a wheel shaft, a top end of said wheel shaft extending upwardly through said top and bottom sides of said mount such that said wheel shaft is rotatably coupled to said mount.

6. The assembly according to claim 5, further comprising an axle coupled to a bottom end of said wheel shaft such that said axle forms a T-shape with respect to said wheel shaft.

7. The assembly according to claim 6, further comprising said wheels each being rotatably coupled to opposite ends of said axle.

8. The assembly according to claim 7, further comprising said motor being coupled to said wheel shaft.

9. The assembly according to claim 8, further comprising a gear box mechanically coupled to said motor such that said motor drives said gear box.

10. The assembly according to claim 9, further comprising a chain coupled between said gear box and said wheels such that said gear box rotates said wheels when said motor drives said gear box.

11. The assembly according to claim 1, further comprising said second actuator being coupled between a front side of said perimeter edge of said mount and a wheel shaft such that said second actuator is configured to rotate said wheel shaft in a first direction and a second direction.

12. The assembly according to claim 1, further comprising:
a power supply configured to be coupled to the trailer;
said power supply being electrically coupled to said control; and
said power supply comprising at least one battery.

13. A trailer steering assembly comprising:
a trailer;
a mount, said mount having a perimeter edge extending between a top side and a bottom side of said mount;
a plurality of arms movably coupled to and extending rearwardly from a back side of said perimeter edge of said mount;
a plurality of gussets each movably coupled to a distal end of an associated one of said arms with respect to said mount, said gussets being coupled to said trailer such that said mount is movably coupled to said trailer;
a first actuator coupled between said arms and said trailer such that said first actuator positions said mount between a raised position and a lowered position with respect to said trailer;
a wheel shaft, a top end of said wheel shaft extending upwardly through said top and bottom sides of said mount such that said wheel shaft is rotatably coupled to said mount;
an axle coupled to a bottom end of said wheel shaft such that said axle forms a T-shape with respect to said wheel shaft;
a pair of wheels each rotatably coupled to opposite ends of said axle such that said wheels are configured to abut a support surface when said mount is positioned in said lowered position;
a motor coupled to said wheel shaft;
a gear box mechanically coupled to said motor such that said motor drives said gear box;
a chain coupled between said gear box and said wheels such that said gear box rotates said wheels when said motor drives said gear box;
a second actuator coupled between a front side of said perimeter edge of said mount and said wheel shaft such that said second actuator is configured to rotate said wheel shaft in a first direction and a second direction wherein said wheels are positioned at a selected angle with respect to said mount wherein said trailer is steered;

a control configured to be held by a user, said control being electrically coupled to said first actuator, said second actuators and said motor such that said control is configured to actuate and de-actuate said first actuator, said second actuator and said motor; and a power supply configured to be coupled to the trailer, said power supply being electrically coupled to said control, said power supply comprising at least one battery.

\* \* \* \* \*